July 5, 1955     HENRI-GEORGES DOLL     2,712,627
ELECTRICAL RESISTIVITY WELL LOGGING METHOD AND APPARATUS Filed May 12, 1950     5 Sheets-Sheet 1

INVENTOR.
HENRI-GEORGES DOLL
BY
Campbell, Brumbaugh, Free
& Graves
HIS ATTORNEYS.

July 5, 1955 HENRI-GEORGES DOLL 2,712,627
ELECTRICAL RESISTIVITY WELL LOGGING METHOD AND APPARATUS
Filed May 12, 1950 5 Sheets-Sheet 2

INVENTOR.
HENRI-GEORGES DOLL
BY
Campbell, Brumbaugh, Free & Graves
HIS ATTORNEYS.

INVENTOR.
HENRI-GEORGES DOLL
BY
Campbell, Brumbaugh, Free & Graves
HIS ATTORNEYS.

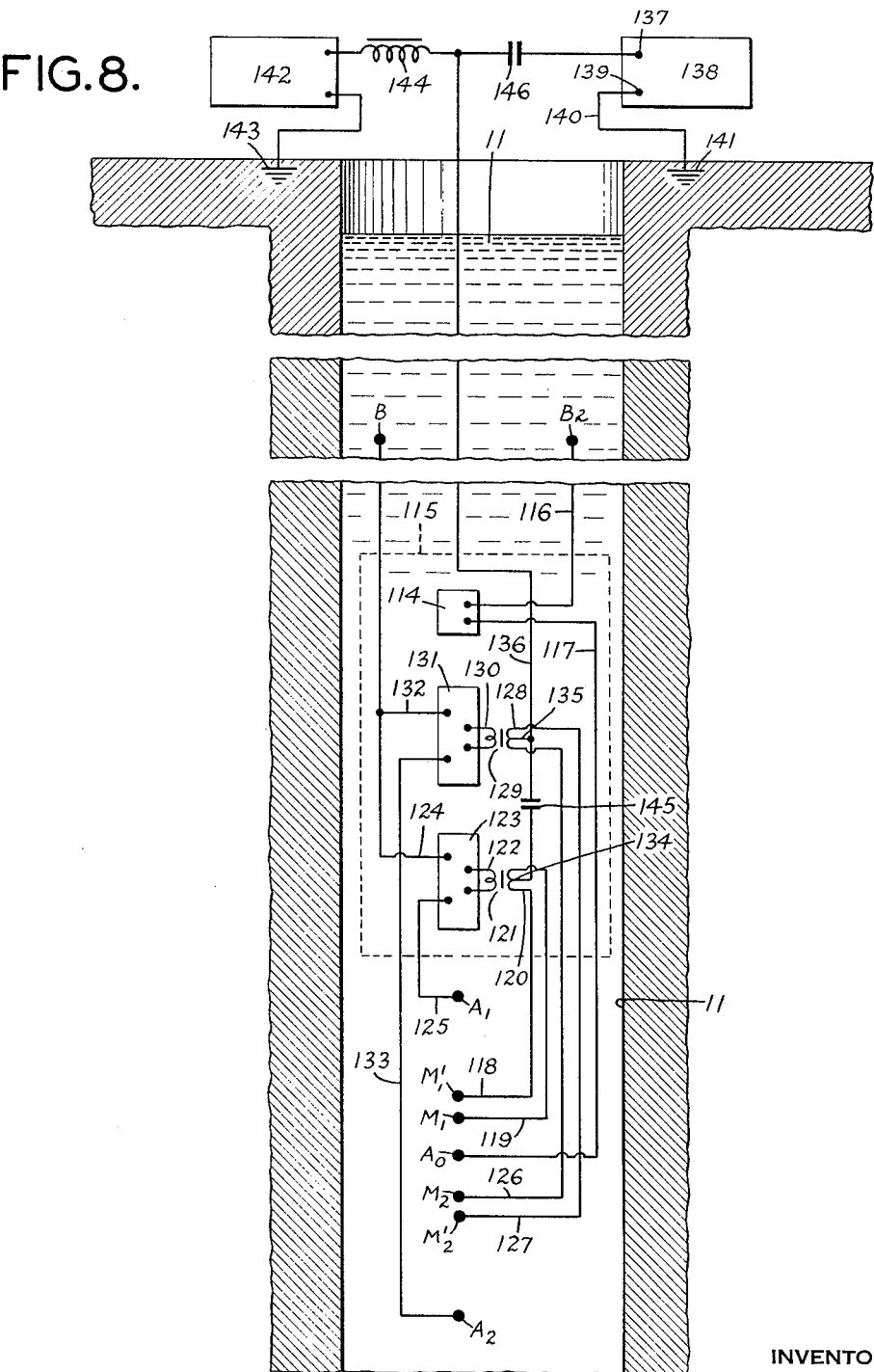

United States Patent Office 2,712,627
Patented July 5, 1955

2,712,627

ELECTRICAL RESISTIVITY WELL LOGGING METHOD AND APPARATUS

Henri-Georges Doll, Ridgefield, Conn., assignor to Schlumberger Well Surveying Corporation, Houston, Tex., a corporation of Delaware Application May 12, 1950, Serial No. 161,641

30 Claims. (Cl. 324—1)

This invention relates to methods and apparatuses for logging the electrical resistivity of earth formations traversed by a well drilled into the earth. More particularly, it has to do with new and improved methods and apparatuses of this character which are capable of producing relatively finely detailed logs that are more accurately representative of the true formation resistivities, especially for comparatively thin strata.

It is common practice in the oil producing industry to make logs of the electrical resistivity of earth formations traversed by a well as a function of depths in the well. Usually such logs are produced by emitting current from an electrode which is moved through the bore hole, and recording variations in either the current emitted, or the potential difference between a potential electrode located near the current electrode and a reference point. The present invention relates to novel and highly effective well logging methods and apparatuses of this general category which afford advantages not obtainable with the conventional well logging systems available heretofore.

It is an object of the invention to provide new and improved methods and apparatuses for logging the electrical resistivity of earth formations traversed by a well, in which the shape of the distribution of the current emitted from an electrode lowered into the bore hole is maintained substantially unaltered during a run, regardless of the relative resistivities of adjacent formations, or of the formations and the bore hole liquid.

Another object of the invention is to provide new and improved well logging methods and apparatuses of the above character which are capable of logging thin strata with greater accuracy than has been possible heretofore.

A further object of the invention is to provide new and improved well logging methods and apparatuses of the above character which provide logs that are more accurately representative of the true formation resistivities.

Still another object of the invention is to provide new and improved well logging methods and apparatuses of the above character which are capable of producing logs which delineate more sharply the variations in the resistivities of the formations along the bore hole.

In accordance with the invention, at least one principal current electrode is disposed in the bore hole and additional means are employed for plugging the hole electrically against current flow at at least one nearby location. This is accomplished by passing current into the bore hole from an auxiliary current electrode disposed near said location, and adjusting the intensity of the current emitted by the auxiliary electrode to bring the resultant electric field (i. e. the field resulting from energization of the principal and auxiliary electrodes) at said location substantially to zero. Preferably, the bore hole is plugged electrically in this fashion at locations above and below the principal electrode. Under these conditions, there can be no appreciable flow of current from the principal current electrode in the longitudinal direction along the bore hole. Instead, the current is caused to flow through the surrounding formations in a direction substantially perpendicular to the axis of the bore hole over a considerable lateral distance therefrom.

A pair of longitudinally spaced apart electrodes is disposed at a location in the bore hole where a substantially zero field is desired, and the potential difference between the pair of electrodes is used to control automatically the intensity of the current emitted by one or more auxiliary current electrodes so as to maintain the said potential difference substantially at zero.

Preferably, a plurality of pairs of longitudinally spaced apart electrodes are disposed at locations in the bore hole where substantially zero fields are desired, and the potential difference between the electrodes in each pair is used to control automatically the intensity of the current emitted by auxiliary current electrodes so as to maintain the said potential difference substantially at zero. As a result, the distribution of the current emitted by the principal current electrode remains substantially constant during a run, regardless of variations in the relative resistivities of adjacent formations or of the formations and the conducting liquid which is usually present in newly drilled wells.

Indications of the electrical resistivities of the formations surrounding a well at different depths are obtained by logging the potential difference between a point near or at a location in the bore hole where the field is being maintained substantially at zero, according to the invention, and a reference point. Such indications correspond, in effect, to the resistivity of material in a thin cross-section of a formation averaged over a considerable lateral distance from the principal current electrode. The invention thus enables a substantial lateral depth of investigation to be attained which may extend beyond the zone invaded by drilling fluid, for example.

It will be apparent, therefore, that the method and apparatus of the invention tend to minimize the influence of the conductive drilling mud in the well and of other adjacent conductive strata on the resistivity values logged. As a result, the resistivity values obtained will approach the true resistivity values of the formations. Further, by selecting a short enough spacing between the locations in the bore hole where substantially zero field is to be maintained, thin formations can be logged with the same degree of accuracy as thick formations.

The invention may be better understood from the following detailed description of several representative embodiments, taken in conjunction with the accompanying drawings in which:

Fig. 8 is a schematic diagram of still another embodiment in which separate sources of power are disposed in the well with the electrodes for supplying current to the principal and auxiliary current electrodes.

Figure 1:
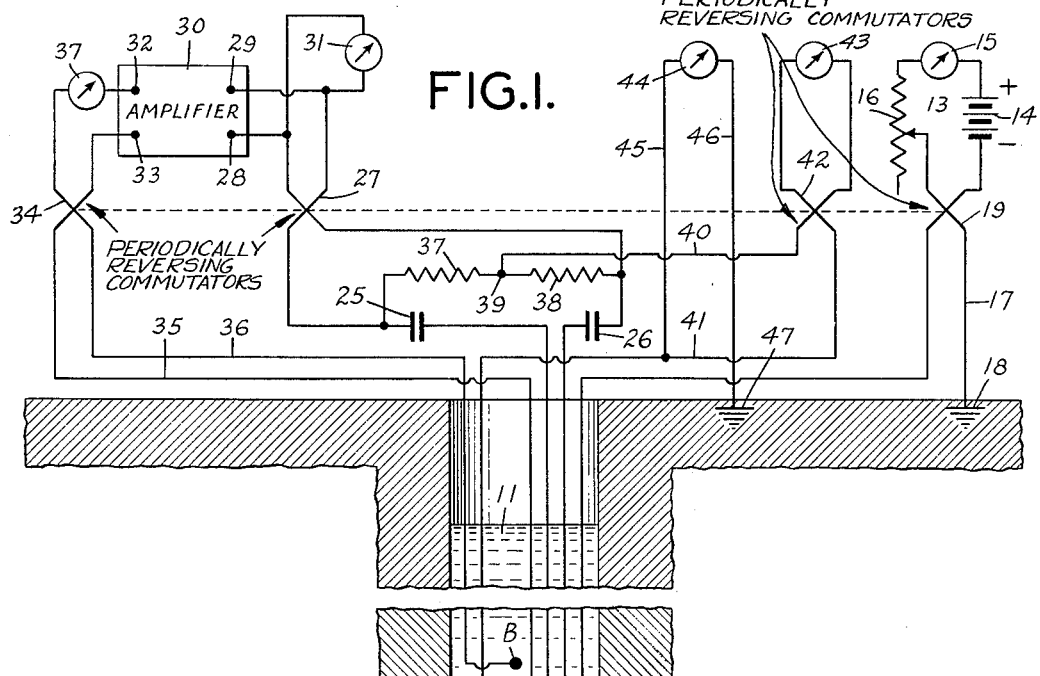
Fig. 1 is a schematic diagram of a typical electrical logging system constructed according to the invention.

In the form of the invention shown in Fig. 1, the well logging system comprises a principal current electrode $A_0$ disposed in a bore hole 10 which contains a column of more or less conducting liquid 11 such as drilling mud, for example. The electrode $A_0$ is connected by a conductor 12 in a supporting cable (not shown) to a source of electrical energy 13 at the surface of the earth, the circuit being completed through a conductor 17 connected to ground 18 at the surface of the earth.

The electrical energy source 13 may comprise, for example, a battery 14 connected in series with a current indicating instrument 15 and a rheostat 16. Interposed between the source of electrical energy 13 and the conductors 12 and 17 is a conventional commutator 19 which serves to reverse the connections between the source 13 and the conductors 12 and 17 periodically in accordance with the usual well logging practice.

The bore hole 10 can effectively be plugged electrically at locations above and below the electrode $A_0$ that are defined by pairs of potential electrodes $M'_1$, $M_1$, and $M_2$, $M'_2$, respectively. The potential electrodes $M_1$ and $M_2$ are connected together by an insulated conductor 20 and are preferably located equal short distances on opposite sides of the principal current electrode $A_0$. Similarly, the potential electrodes $M'_1$ and $M'_2$ are connected together by an insulated conductor 21 and are located equal greater distances on opposite sides of the principal current electrode $A_0$.

The potential differences between the electrodes $M'_1$ and $M_1$ and $M'_2$ and $M_2$ are maintained substantially at zero according to the invention by emitting current from a pair of auxiliary current electrodes $A_1$ and $A_2$. The latter electrodes are connected together by an insulated conductor 22 and are located equal distances on opposite sides of the principal current electrode $A_0$, outside of the potential electrodes $M'_1$ and $M'_2$.

The potential electrodes $M'_1$ and $M_1$ are connected by the conductors 23 and 24, respectively, in the supporting cable (not shown), through the D. C. blocking condensers 25 and 26, respectively, and a conventional commutator 27 to the input terminals 28 and 29, respectively, of a D. C. power amplifier 30 which is described in greater detail below. The condensers 25 and 26 prevent any direct currents that may be picked up by the electrodes $M'_1$, $M_1$, $M_2$ or $M'_2$ from passing to the input terminals of the amplifier 30.

The commutator 27 is driven in synchronism with the commutator 19 and it is so phased as to convert the periodically varying potentials picked up between each pair of electrodes $M'_1$, $M_1$ and $M'_2$, $M_2$ to direct current values which are fed to the input terminals 28 and 29 of the amplifier 30. A conventional millivolt meter 31 may be connected across the amplifier input terminals 28 and 29 so as to provide indications of the potential difference which is fed to the amplifier 30.

The output terminals 32 and 33 of the amplifier 30 are connected through another conventional commutator 34 to the conductors 35 and 36 which pass through the supporting cable (not shown) to the electrodes $A_1$ and B, respectively, the electrode B being located a considerable distance above the other electrodes of the assembly in the bore hole. The commutator 34 is also driven in synchronism with the commutator 19 and it should be properly adjusted to insure that the currents emitted by the auxiliary current electrodes $A_1$ and $A_2$ will be correctly phased with respect to the current emitted by the principal electrode $A_0$ so that they will tend to reduce the potential differences between the electrodes $M'_1$ and $M_1$ and $M'_2$ and $M_2$.

The amplifier 30 is designed with ample transconductance to feed back sufficient current to the electrodes $A_1$ and $A_2$ to maintain the average of the potential differences between each pair of electrodes $M'_1$, $M_1$ and $M'_2$, $M_2$ substantially at zero. When the electrode system lies midway between the boundaries of a formation, each of these potential differences actually becomes negligible, and the bore hole is, in effect, plugged electrically. A conventional current indicating instrument 37 may be connected in series with the amplifier output terminal 32 for providing indications of the control current supplied to the auxiliary current electrodes $A_1$ and $A_2$ in the bore hole.

The electrical resistivities of the earth formations surrounding the bore hole 10 may be accurately logged by obtaining indications of potential differences between a point in the vicinity of either pair of potential electrodes $M_1$, $M'_1$, or $M_2$, $M'_2$ and a reference point. In Fig. 1, a log is made of the average potential of the electrodes $M'_1$ and $M_1$ with respect to the potential of an electrode N located a considerable distance away from the other electrodes in the bore hole.

Instead of placing a potential electrode between the electrodes $M'_1$ and $M_1$ for this purpose, a pair of equal resistors 37 and 38 are connected in series across the conductors 23 and 24 at points between the condensers 25 and 26 and the commutator 27, and the potential values are taken off at the junction 39 between the resistors 37 and 38. To this end, the junction 39 and the electrode N are connected through the conductors 40 and 41, respectively, and through another conventional commutator 42 to a suitable indicating device 43 which is preferably a conventional recording galvanometer of the type commonly used in well logging operations. The commutator 42 is driven in synchronism with the commutator 19 and suitably phased so as to convert the periodically varying potential differences picked up to substantially continuous values.

If simultaneous measurements of spontaneous potentials are desired, they may be obtained by connecting a second recording galvanometer 44 by the conductors 45 and 46 to the conductor 41 and to ground 47 at the surface of the earth, respectively, so that the recording galvanometer 44 will record spontaneous potential differences between electrode N in the bore hole and the ground 47. If desired, the recording galvanometer 44 can be provided with a suitable low pass filter system to make it predominantly responsive to direct current values. Alternatively, the conductor 45 might be connected to the conductor 24 so as to obtain indications of the average spontaneous potential picked up in the general vicinity of the potential electrodes $M_1$ and $M_2$ in the bore hole. In such case, however, conventional filter means should be connected between the conductor 45 and the ground 47 to keep periodically varying potentials picked up by the electrodes $M_1$ and $M_2$ out of the recording galvanometer 44.

Figure 1A:
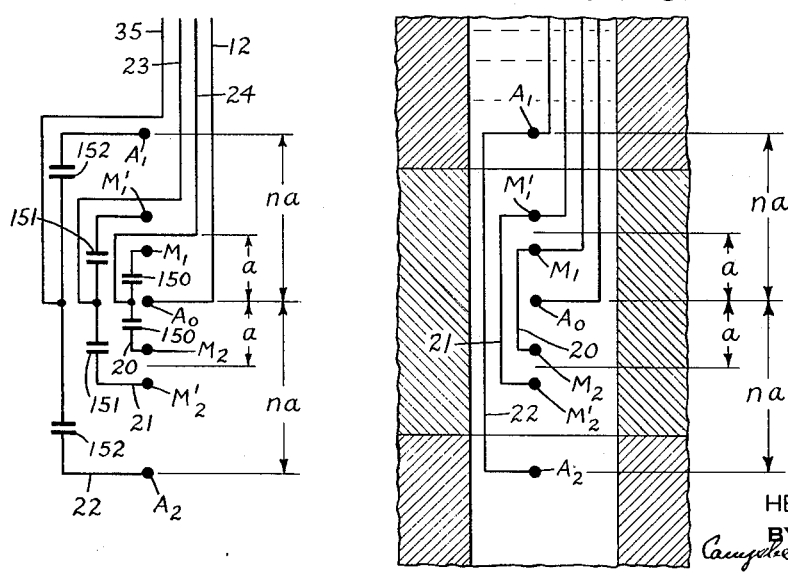
Fig. 1A illustrates schematically a modified electrode array designed so as not to affect adversely the distribution of spontaneous potentials in a bore hole.

It should be noted that the conductive paths provided by the conductors 20, 21 and 22 and the electrodes connected thereto will tend to disturb the spontaneous potentials in the bore hole. This can be avoided by introducing capacitance elements in series with the conductors 20, 21 and 22 so as to block the passage of D. C. while providing a low impedance path to the commutated current. Thus, in a symmetrical array, as shown in Fig. 1A, pairs of condensers 150, 151 and 152 might be connected in series with the conductors 20, 21 and 22, respectively, the insulated conductors 24, 23 and 35 being connected between the two condensers comprising each pair, respectively.

In a practical case, the distances from the principal current electrode $A_0$ to points located halfway between each pair of electrodes $M_1$, $M'_1$ and $M_2$, $M'_2$ may be the same and approximately equal to the diameter of the bore hole 10. The distances between the principal current electrode $A_0$ and the auxiliary current electrodes $A_1$ and $A_2$ may also be equal and approximately two and one-half times the bore hole diameter. These electrode spacings have been found suitable for measuring the resistivities of sections of the formations greater than about twice the diameter of the bore hole in thickness.

The electrodes in the bore hole, particularly those used for picking up potentials, i. e., the electrodes $M'_1$, $M_1$, $M_2$ and $M'_2$ should be electrochemically stable in the conductive bore hole fluid 11 in order to prevent the occurrence of spurious potentials of a few millivolts in magnitude. Experience indicates that with care, the conventional lead electrodes usually employed in well logging operations are satisfactory for the purpose.

In operation, the current supplied from the source of electrical energy 13 to the principal current electrode $A_0$ is adjusted to a desired value and is preferably maintained constant during the logging operation, although this is not necessary. The electrode system is then lowered through the bore hole by the conventional winch and cable (not shown) customarily employed for this purpose. Any potential differences appearing between the electrodes $M'_1$ and $M_1$ or $M'_2$ and $M_2$ will cause the amplifier 30 to supply sufficient current to the auxiliary current electrodes $A_1$ and $A_2$ to reduce such potential differences substantially to zero.

Regardless of the relative electrical resistivities of the surrounding formations, therefore, or of the formations with respect to the conductive bore hole liquid, practically no current from the principal current electrode $A_0$ will flow longitudinally along the bore hole. Instead, the current emitted by the electrode $A_0$ will be caused to flow into the formation from the bore hole substantially perpendicularly to the axis of the bore hole over an interval approximately equal to twice the spacing between the electrode $A_0$ and the point lying halfway between the electrodes $M'_1$ and $M_1$. Further, the lines of current over that interval will remain substantially parallel to one another for a considerable lateral distance into the formation. As a result, very thin formations can be accurately logged and the electrical resistivity indications obtained for thin formations are more accurate than those obtainable heretofore. Furthermore, the influence of a conductive mud column on the resistivity measurements becomes practically negligible.

Upon analysis in the well known manner, it can readily be shown that the apparent formation resistivity $\rho_a$ determined by a well logging system of the type illustrated in Fig. 1 is given by the equation:

$$\rho a = K \frac{V_p}{i_0} \quad (1)$$

where $$K = 4\pi \left[ \frac{m}{(na+a)} + \frac{1}{a} + \frac{m}{(na-a)} \right]^{-1} \quad (2)$$

$V_p$ is the potential difference between a point located halfway between the electrodes $M'_1$, $M_1$ or $M_2$, $M'_2$, and the electrode N; $i_0$ is the current emitted by the electrode $A_0$; $a$ is the distance between the electrode $A_0$ and a point halfway between the electrodes $M'_1$, $M_1$ or $M_2$, $M'_2$ (hereinafter designated the "spacing"); $na$ is the distance between the electrode $A_0$ and either of the electrodes $A_1$ or $A_2$ (hereinafter designated the "spread"); $n$ is a constant and $$m = \frac{(n^2-1)^2}{4n}$$

Designating $i_1$ and $i_2$ as the currents required to be emitted by the electrodes $A_1$ and $A_2$, respectively, to maintain the potential differences between each pair of electrodes $M'_1$, $M_1$ and $M_2$, $M'_2$, respectively, substantially at zero, then $$\frac{i_1}{i_0} = \frac{i_2}{i_0} = m$$

when the electrode system lies in a homogeneous and isotropic medium.

It will be apparent from relation (1) that, if a known current $i_0$ is emitted from the principal current electrode $A_0$, the log made by the recording galvanometer 43 can be calibrated in terms of electrical resistivities.

The potential need not be measured at the midpoint between the electrodes $M_1$, $M'_1$, or $M_2$, $M'_2$ but may be measured at other points such as at any of the electrodes $M_1$, $M'_1$, $M_2$, $M'_2$, for example. In fact, a potential measuring electrode can be placed arbitrarily in the vicinity of either electrode $M'_1$ or $M'_2$, or in the interval between those electrodes. An appropriate K for relation (1) can be determined for the position chosen.

Analysis of the results to be expected with systems designed according to the invention, and comparison with logs recorded in the bore hole using different spreads indicates that there is an optimum spread ratio $n$ which lies between 2 and 3.

Figure 2:
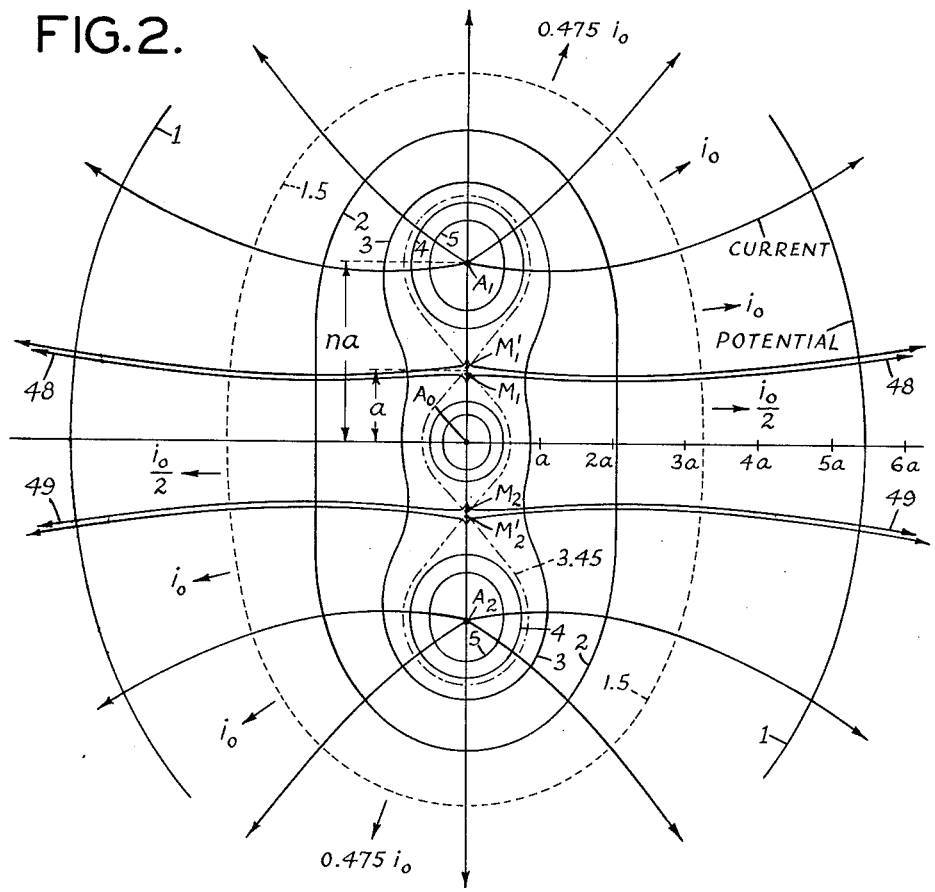
Fig. 2 illustrates generally the directions of the current lines and equipotential surfaces surrounding the electrodes in the system of Fig. 1.

In Fig. 2 is shown a typical plot of the equipotential and current lines in a plane containing the axis of the bore hole for the case where the spread ratio $n$ is 2.43. This spread ratio gives the optimum field pattern for an electrode arrangement as in Fig. 1 situated in a homogeneous and isotropic medium. The values given for the equipotential lines in Fig. 2 are expressed in units of $$\rho \frac{i_0}{4\pi a}$$

The intensity of the current flowing between adjacent surfaces is indicated by the arrows and is expressed in terms of the total current $i_0$ issuing from the principal current electrode $A_0$. The total current from the amplifier 30 (Fig. 1) through the auxiliary current electrodes $A_1$ and $A_2$ is $4.95 i_0$.

It will be observed that the current lines from the electrode $A_0$ between the boundaries 48 and 49 extend in a substantially lateral direction for an appreciable distance as compared to the spacing $a$ before they begin to diverge from the lateral direction. Further, it will be noted that points in the vicinity of the electrodes $M'_1$, $M_1$, or $M_2$, $M'_2$, where the potential difference from which the resistivity log is made is picked up, lie on equipotential surfaces which surround the principal current electrode $A_0$ and are generally oval in shape. For a bore hole of diameter $a$, it is evident that the equipotential surface which passes through the midpoints between $M'_1$, $M_1$ and $M_2$, $M'_2$, in accordance with the conditions pertaining to Fig. 2, extends at least beyond the wall of the bore hole opposite the electrode $A_0$. Therefore, an electrical logging system of the type shown in Fig. 1 will measure substantially the resistivity of the formation and will practically eliminate the influence of the resistivity of the mud column on the measurements.

Moreover, since the major portion of the current emitted by the electrode $A_0$ flows substantially perpendicularly to the axis of the bore hole, it will be understood that the potential at points in the vicinity of the electrodes $M'_1$, $M_1$, and $M_2$, $M'_2$ will be little affected by the value of the conductivity of the bore hole liquid. The resistivity values obtained in accordance with the invention, therefore, will be representative of the actual formation resistivities to a relatively high degree of accuracy.

Furthermore, with appropriate spread ratios, the thickness of the laterally extending current sheet can be altered such that its thickness at some distance from the bore hole is even less than the spacing $a$. With a spread ratio near the optimum value, however, the current sheet maintains a rather uniform thickness to a large radius before appreciable divergence occurs, as appears from Fig. 2. If the spacing $a$ is made about half the thickness of the thinnest stratum to be logged, and a preferred spread ratio between 2 and 3 is taken, it is clear that the resistivity of such stratum will be clearly exhibited by measuring or recording the variations of potential in a region located within an interval of a distance $a$ from the electrode $A_0$.

Though the preferred position of the potential measuring electrode is at a location where the field in the bore hole becomes substantially nullified, the electrode can be placed near such a position and still obtain an improved resistivity log following the new methods of this invention. As can be inferred from the drawing of the field pattern for Fig. 2, the equipotential surfaces have saddles in the region of the positions of the paired electrodes $M_1$, $M'_1$ and $M_2$, $M'_2$. The potential measuring electrode can be positioned over an interval longitudinally in this region either towards $A_0$ or $A_1$ or $A_2$ without deviating appreciably from the "K" given by relationship (2).

It should be noted, furthermore, that even though the connections to the auxiliary and current electrodes are interchanged, the shape of the equipotential surfaces remains as given in Fig. 2 for the case of a homogeneous and isotropic electrically conducting medium. Such an alternative system can be obtained, for example, in Fig. 1, by connecting the conductors 12 and 35 to the electrodes $A_1$ and $A_0$, respectively, instead of the electrodes $A_0$ and $A_1$, respectively. In that case, the current flowing through the electrode $A_0$ will be the auxiliary control current. This will also cause a variation in the potential difference between a measuring electrode positioned in an interval about $A_0$ and a reference electrode. The resistivity measurement, however, will be proportional to the ratio between this potential difference and the control current, which ratio can be measured continuously by an appropriate apparatus.

Similar interchanges for many electrode embodiments will be apparent to those skilled in the art whereby the advantage of the new methods of this invention can be used to obtain greatly improved resistivity logs.

Some idea of the accuracy with which the resistivities of earth formations can be logged according to the invention may be obtained from the table below. The values in column I correspond to different ratios of the true resistivity $R_t$ of the formation to the mud resistivity $R_m$ of the bore hole liquid at the same depths. The values in the middle and right hand columns are the ratios between computed apparent formation resistivities $R_a$ and the resistivities $R_m$ of the bore hole liquid at the same depths. In the middle column, the apparent resistivities $R_a$ used in computing the ratios correspond to values that would be obtained by a conventional well logging system of the type described in Patent No. 1,894,328, for example, located in a bore hole opposite the formation, while the apparent resistivities used in computing the values in the right hand column correspond to those which would be obtained with a well logging system according to the invention having the same spacing as the conventional system and having a spread ratio of 2.43, located in the bore hole opposite the formation. The left hand column gives the ratios between the true resistivities $R_t$ of the undisturbed formations and the resistivities $R_m$ of the bore hole liquid at the temperatures opposite the respective formations. All computed apparent resistivity values are for thick formations substantially uninvaded by the filtrate from the drilling mud and for a spacing equal to the bore hole diameter.

Table

| $\frac{R_t}{R_m}$ | $\frac{R_a}{R_m}$ | |
|---|---|---|
| | Conventional Method | Method of the Present Invention |
| 5 | 4.6 | 4.5 |
| 10 | 8.4 | 8.9 |
| 50 | 29 | 45 |
| 500 | 130 | 480 |

It will be evident from the table that apparent resistivity values obtained with well logging apparatus according to the present invention will be exceedingly close to the true formation resistivities even when the ratio between the formation resistivity and the resistivity of the bore hole liquid is very high.

Figure 3:
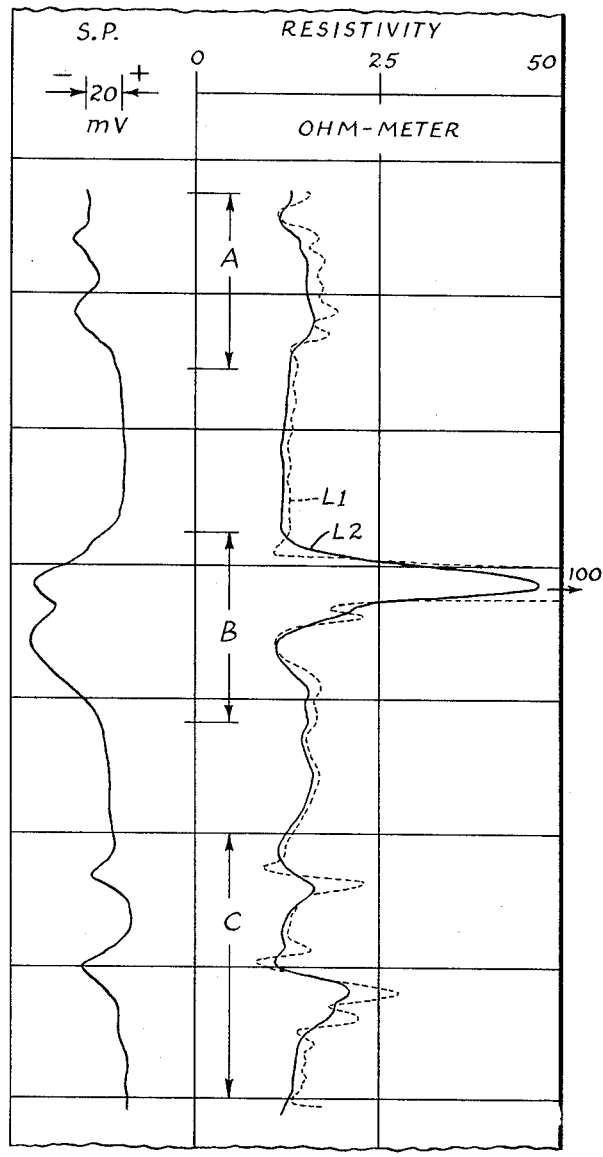
Fig. 3 shows a typical log produced by the apparatus of Fig. 1 in a well.

In Fig. 3 is a typical field log $L_1$ which was obtained with the well logging apparatus shown in Fig. 1 for an average spacing of 12 inches and a spread ratio $n=2$. A log $L_2$ obtained by a conventional well logging system with a spacing of 16 inches between the current and potential electrodes is also shown for purposes of comparison. Each depth interval in Fig. 3 is twenty feet. It will be observed that the log $L_1$ shows much greater details in the sections A, B and C than does the conventional electrical log $L_2$. The different electrode spacings used (16 inches for the conventional system and 12 inches for the system according to the invention) will not account for significant differences both in the magnitudes of the recorded resistivities and in the sharpness of the boundaries for the changes of resistivity. It will be apparent, therefore, that the invention enables resistive streaks separated by conductive ones to be clearly delineated as in section C of the log $L_1$, for example.

Figure 4:
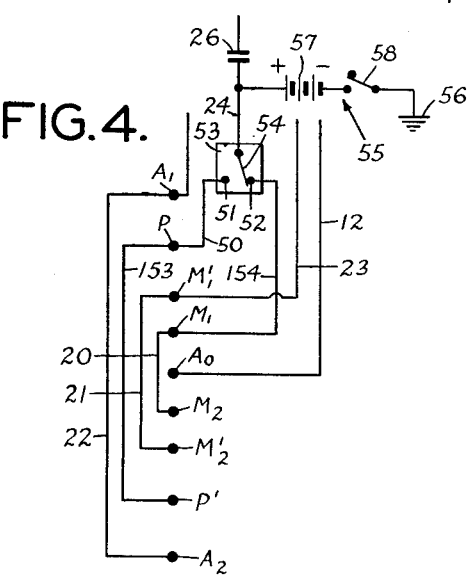
Fig. 4 is a schematic diagram of a modified electrode system including means for producing zones of substantially zero field selectively at different locations on opposite sides of the principal current electrode.

If desired, means may be provided according to the invention for enabling the field to be brought substantially to zero at either of two pairs of locations on opposite sides of the principal current electrode $A_0$, as shown in Fig. 4. In this embodiment, a third pair of potential electrodes P and P', connected by an insulated conductor 153 of negligible resistance, are located equal distances on opposite sides of the principal current electrode $A_0$, the electrode P lying between the electrodes $A_1$ and $M'_1$, and the electrode P' being disposed between the electrodes $A_2$ and $M'_2$, for example. The electrodes $M_1$ and P may be connected by the conductors 154 and 50, respectively, to the terminals 52 and 51 of a solenoid operated switch 53, for example, the movable contact 54 of which is connected to the conductor 24 in the supporting cable (not shown).

The movable contact 54 of the relay 53 may normally be in engagement with the contact 52 so that the electrode $M_1$ is connected to the cable conductor 24. When the relay 53 is energized, however, the movable contact 54 is adapted to be moved out of engagement with the contact 52 and into engagement with the contact 51 so as to connect the electrode P to the cable conductor 24.

The relay 53 may be energized from the surface of the earth in any suitable manner as by a circuit 55 connected at its opposite ends to the cable conductor 24 on the bore hole side of the condenser 26 and to the ground 56, respectively, and including a source of electrical energy 57 and a switch 58 in series. This embodiment of the invention operates in exactly the same manner as that shown in Fig. 1, except that a substantially null field may be established either between the electrodes $M_1$, $M'_1$, and $M_2$, $M'_2$, or between the electrodes $M'_1$, P, $M'_2$, P', by operation of the switch 58 at the surface of the earth. In that manner, logs can be obtained conveniently using two different spacings with the same spread.

By suitable arrangements, a relay similar to the relay 53 can be caused to change the spread through the use of additional pairs of auxiliary current electrodes (not shown).

By providing additional electrodes, conductors, etc., a resistivity logging system can be devised in which a substantially zero field is established simultaneously at more than two locations in the bore hole. In that way, multiple lateral sheets of current can be produced, whereby parallel flow of current will be maintained over a great depth of investigation.

Figure 5:
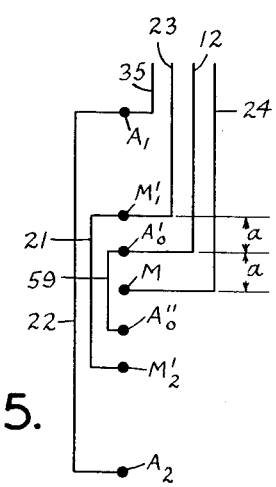
Fig. 5 illustrates schematically another form of electrode system according to the invention.

In the modification shown in Fig. 5, two principal electrodes $A'_0$ and $A''_0$, connected by an insulated conductor 59 of negligible resistance, are located equal distances on opposite sides of a potential electrode M. The electrode M is connected to the conductor 24, while the electrode A'₀ is connected to the conductor 12. Two other electrodes M'₁ and M'₂ are placed beyond the electrodes A'₀ and A''₀, respectively, on opposite sides of the electrode M. The electrodes M'₁ and M'₂ are shown here as also connected by an insulated conductor 21.

In operation, current through the principal electrodes A'₀ and A''₀ is maintained substantially constant while the potential difference between the electrode M and the electrodes M'₁ and M'₂ is maintained at a negligible value by current emitted from the electrodes A₁ and A₂ and supplied by the amplifier 30 (Fig. 1). It has been found that this arrangement can provide three locations wherein the field within the bore hole can become negligible. By using appropriate spacings, these locations can be chosen to occur substantially at the positions of the electrodes M'₁, M and M'₂. While in this case the details of the current distribution will be different from that of Fig. 2, it will be understood that the principal current, now issuing from the two electrodes A'₀ and A''₀, will proceed substantially in a lateral direction from the axis of the bore hole.

The spacing between the electrode M and each of the principal current electrodes A'₀ and A''₀ should preferably be one-half the spacing between the potential electrode M and each of the potential electrodes M'₁ and M'₂, respectively. In this embodiment, the distance between the potential electrode M and either of the electrodes A'₀ and A''₀ is again designated as the spacing. The spread can be designated as the separation distance between electrode M and the outside auxiliary electrodes A₁ or A₂. In this electrode array, for the preferred spacing arrangement mentioned above, the spread should preferably be between three and four times the spacing. The constant K in equation 1 above, which depends upon the geometrical arrangement of the electrodes, can be calculated for Fig. 5 in the same way as it was determined for Fig. 1.

Figure 6:
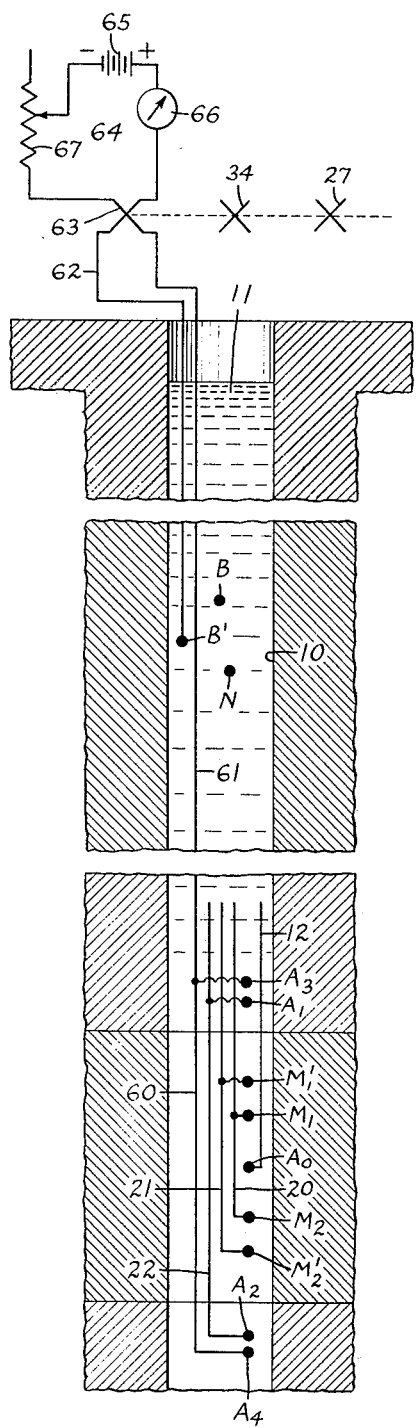
Fig. 6 is a schematic diagram of another embodiment which uses an auxiliary source of power and an additional pair of current electrodes in the bore hole to aid in establishing the zones of zero field in the bore hole.

Field experience indicates that the resistivity measurements obtained with apparatus of the type shown in Fig. 1, for example, for formations having electrical conductivities less than about five ohm meters are subject to a relative deviation that may attain a few percent, because of the finite transconductance of the amplifier 30. One way of practically eliminating this deviation, however, is to place an additional pair of auxiliary current electrodes A₃ and A₄ in the bore hole in the vicinity of the electrodes A₁ and A₂, and to supply to them currents of substantially the same polarity and phase as those flowing through the electrodes A₁ and A₂, as shown in Fig. 6. The second pair of auxiliary current electrodes A₃ and A₄ are connected together by an insulated conductor 60 of negligible resistance.

The electrode A₃ and a relatively remote electrode B' are connected by the conductors 61 and 62, respectively, in the supporting cable (not shown) through a conventional commutator 63 to a source of electrical energy 64 at the surface of the earth. The source 64 may comprise a battery 65 connected in series with a current indicating instrument 66 and a rheostat 67. The commutator 63 should be driven in synchronism with the commutator 19 (Fig. 1) and it should be properly phased so that the periodically varying current it supplies to the electrodes A₃ and A₄ will be of the same polarity and phase as that supplied to the auxiliary electrodes A₁ and A₂.

The intensity of the current supplied by the source 64 may be adjusted to a constant value so as to bring the potential differences between the electrodes M₁ and M'₁, and M₂ and M'₂, respectively, substantially to zero when the electrode assembly is opposite a thick and highly conductive formation. Under these conditions, the potential difference appearing at the input terminals of the amplifier 30 will also be substantially zero. If desired, the current from the source 64 may be supplied directly to the electrodes A₁ and A₂, in which case the auxiliary electrodes A₃ and A₄ and the cable conductor 61 may be omitted.

Figure 7:
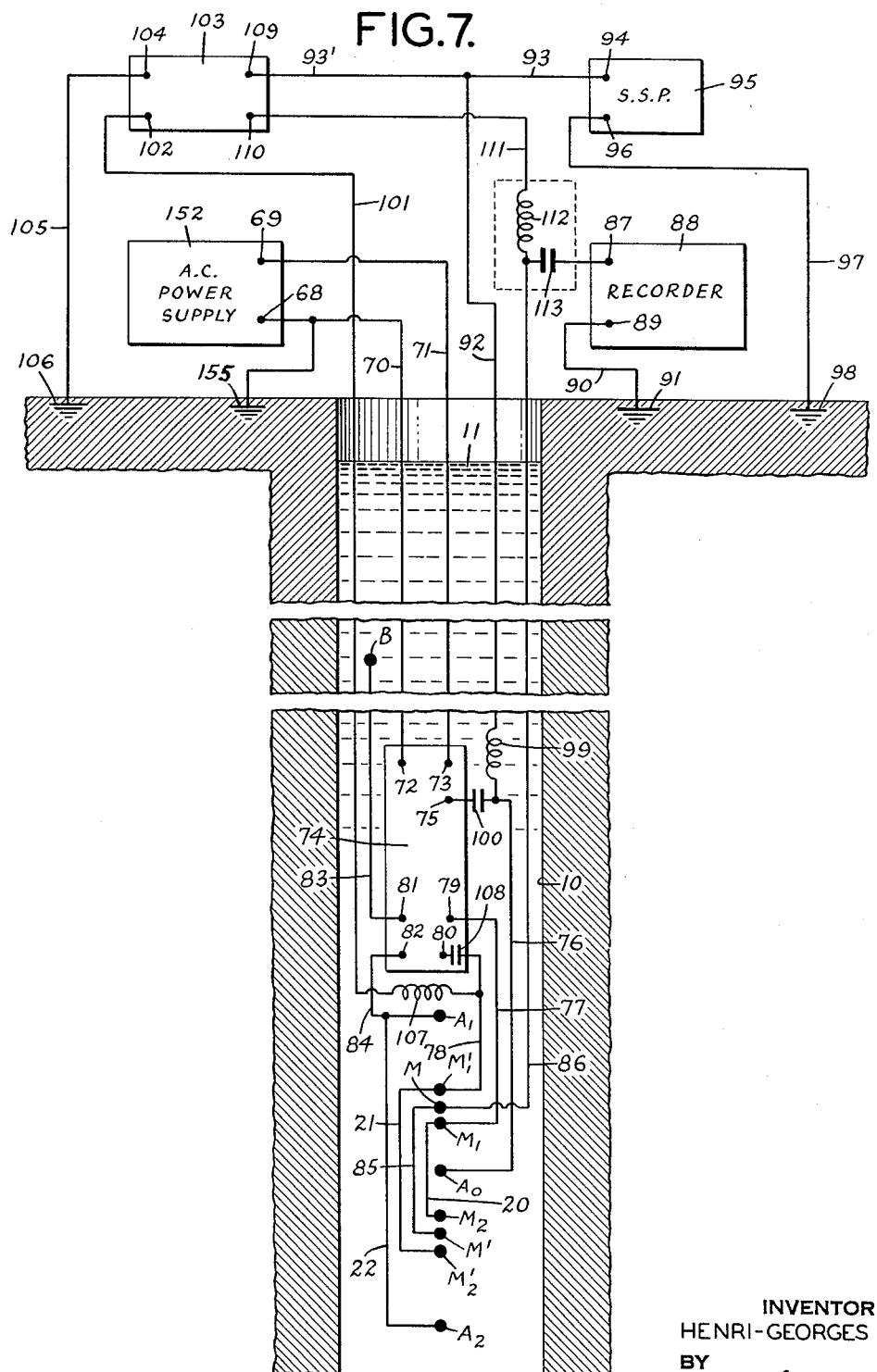
Fig. 7 is another modification which is adapted to measure simultaneously static spontaneous potentials and the electrical resistivity of the formations according to the invention.

The number of cable conductors required for resistivity measurements may be substantially reduced by disposing certain of the apparatus in the bore hole with the electrode assembly, as shown in Fig. 7. In this embodiment, an alternating current power supply 152 is located at the surface of the earth which feeds alternating current from its terminals 68 and 69 through the cable conductors 70 and 71 to the terminals 72 and 73 of a conventional type of amplifier 74 designed to have ample transconductance and negligible phase shift for the operating frequency, the usual precautions being taken to keep out the high pressure bore hole liquid 11.

A substantially constant alternating current may be supplied to the principal current electrode A₀ from the conductor 71 through any suitable constant current device (not shown) interposed between the terminals 73 and 75, a condenser 100 and a conductor 76, with a return through the ground and the terminal 155 to the terminal 68. The potential electrodes M₁ and M'₁ are connected by a conductor 77 and by the conductor 78 and a condenser 108, respectively, to the input terminals 79 and 80, respectively, of the amplifier 74. The output terminals 81 and 82 of the amplifier 74 are connected by the conductors 83 and 84 to the remote electrode B and to the electrode A₁, respectively, as shown. The electrodes A₁, M'₁, M₁, A₀, M₂, M'₂ and A₂ are connected in the same manner as in the array shown in Fig. 1.

The potential measurements are adapted to be made by a pair of potential electrodes M and M', connected by an insulated conductor 85, which are disposed equal distances on opposite sides of the electrode A₀ between the corresponding electrodes of the other two pairs of potential electrodes. The electrode M is connected by a conductor 86 and a condenser 113 to one terminal 87 of a conventional A. C. recording galvanometer 88, the other terminal 89 of which is connected by a conductor 90 to ground 91 at the surface of the earth. By proper calibration of the recording galvanometer 88, the electrical resistivity of the formations at different depths in the bore hole can be exhibited as a function of depth.

If desired, the apparatus shown in Fig. 7 may be adapted to measure simultaneously the electrical resistivities of the formations and spontaneous potentials in accordance with the method described in the applicant's prior Patent No. 2,592,125, issued April 8, 1952.

Thus, static spontaneous potentials may be logged by connecting the principal electrode A₀ through the conductor 76, the choke coil 99, and the conductors 92 and 93 to one terminal 94 of another conventional recording galvanometer 95, the other terminal 96 of which may be connected by the conductor 97 to ground 98 at the surface of the earth. The choke coil 99 and the shunt condenser 100 constitute filter means for keeping alternating current out of the circuit of the recording galvanometer 95, as shown.

The electrode M'₁ is connected by the conductor 78 through a choke coil 107 and a conductor 101 to one output terminal 102 of a conventional power amplifier 103, the other output terminal 104 of which is connected by a conductor 105 to ground 106 at the surface of the earth. The choke coil 107 and the shunt condenser 108 comprise filter means for keeping direct current from the amplifier 103 away from the input circuit of the amplifier 74. One input terminal 109 of the amplifier 103 is connected by the conductors 93' and 92, the choke coil 99 and the conductor 76 to the electrode A₀, and the other input terminal 110 is connected by the conductor 111 through the choke coil 112 and the conductor 86 to the electrode M. The choke coil 112 and the shunt condenser 113 constitute filter means to keep alternating current signals picked up by the electrodes M and M' out of the input circuit of the amplifier 103. Power for the amplifier means 103 can be obtained from self-contained batteries (not shown) or in any suitable manner from an A. C. power supply such as the source 152.

In operation, the recording galvanometer 88 provides indications of the electrical resistivity of the earth formations as described in detail above. Simultaneously, the static spontaneous potential between the electrode $A_0$ and the ground 98 is recorded by the recording galvanometer 95. As described in the aforementioned Patent No. 2,592,125, the amplifier 103 provides an output to the electrodes $M'_1$ and $M'_2$ which tends to reduce the D. C. potential differences between each of the electrodes M and M' and the electrode $A_0$ substantially to zero. Since the resistivity and static spontaneous potential logs are made simultaneously, the problem of correlation of depths is eliminated and an improved simultaneous electrical log is obtained.

In the modification shown in Fig. 8, two separate amplifiers are employed to supply currents to the two auxiliary current electrodes. Referring to Fig. 8, an oscillator 114 is disposed in a pressuretight container 115 which is adapted to be lowered into a bore hole 10 with the electrode assembly. The oscillator and amplifiers may be powered by batteries (not shown) in the container 115 or from a suitable power supply at the surface (not shown) through conductor means in the supporting cable. The oscillator 114 supplies alternating current through the conductors 116 and 117 to a remote electrode $B_2$ and to the principal current electrode $A_0$, respectively.

The potential difference between the potential electrodes $M_1$ and $M'_1$ is supplied through the conductors 119 and 118, respectively, to the primary winding 120 of a transformer 121, the secondary winding 122 of which is connected to the input terminals of a conventional amplifier 123 which may be like the amplifier 74 in Fig. 7. The output terminals of the amplifier 123 are connected by the conductors 124 and 125, respectively, to the remote electrode B and to the auxiliary current electrode $A_1$.

Similarly, the potential electrodes $M_2$ and $M'_2$ are connected by the conductors 126 and 127, respectively, to the primary winding 128 of a transformer 129, the secondary winding 130 of which is connected to the input terminals of a second amplifier 131. The output terminals of the amplifier 131 are connected by the conductors 132 and 133 to the electrode B and to the other auxiliary current electrode $A_2$, respectively.

The transformer primary windings 120 and 128 are provided with midtaps 134 and 135 between which is connected a condenser 145. The midtap 135 is connected to a conductor 136 which extends to the surface of the earth and is connected to one terminal 137 of a conventional A. C. recording galvanometer 138, the other terminal 139 of which is connected by a conductor 140 to ground 141. The galvanometer, therefore, records the average of the potential difference between points located substantially midway between each pair of electrodes $M'_1$, $M_1$, and $M_2$, $M'_2$ and the ground 141 at the surface.

Spontaneous potentials may also be recorded by connecting the conductor 136 to one terminal of a second conventional recording galvanometer 142, the other terminal of which may be grounded at 143. Suitable filter means comprising a choke 144 and a condenser 146 may be provided to keep D. C. out of the recorder 138 and to keep A. C. out of the recorder 142.

The embodiment shown in Fig. 8 operates in essentially the same manner as the apparatus of Fig. 1, except that the amplifiers 123 and 131 separately control the currents supplied to the auxiliary current electrodes $A_1$ and $A_2$, respectively.

The recorder 138 records electrical resistivity values while the recorder 142 simultaneously records spontaneous potentials in the bore hole at the position of the closely spaced electrodes $M_2$ and $M'_2$.

It will be understood that each of the amplifiers 131 and 123 may be appreciably smaller in capacity than the amplifier 74 in Fig. 7. This modification also affords a certain measure of flexibility in that each amplifier is free, to a limited extent, to adjust its power output as required to maintain a substantially null field in the region in the bore hole where its input electrodes are located.

The invention thus provides a novel and highly effective method and apparatus for investigating earth formations traversed by a bore hole. By electrically plugging the bore hole at nearby locations above and below a current emitting electrode, the current is caused to flow substantially perpendicular to the axis of the bore hole over a desired section, the thickness of which can be controlled by proper spacing of the electrodes. As a result, detailed logs can be obtained on which relatively thin conductive and resistive formations can be readily distinguished from one another, and from which very accurate indications of the electrical resistivity of both thin and thick formations can be obtained.

The foregoing disclosures for the determination of resistivities involve measurements of the potential differences between a reference point and a point in the bore hole separated a longitudinal distance from a principal current electrode. It is also possible to determine variations in the resistivity of formations by measuring the potential difference between a principal current electrode and a reference point. In this latter case, the apparatus and methods of the invention, wherein the field is maintained substantially zero at two longitudinal points in the bore hole whose separation interval contains the current electrode, will provide resistivity logs exhibiting in detail the resistivity of the formations, even where the latter are constituted of a succession of thin beds. Furthermore, the accuracy of the resistivity determinations remains high even when the hole is filled with a mud whose resistivtiy is considerably smaller than that of the formations.

As stated, the current $i_0$ emitted by the principal electrode is preferably maintained constant so that the recording galvanometer can be calibrated directly in terms of apparent resistivities. This is not necessary, however, since resistivity values can be determined with a varying current by determining the ratio between the potential which is logged, and the current.

Obviously, the several representative modifications described above and illustrated in the drawings can be considerably modified within the spirit of the invention. For example, the remote power and potential electrodes B and N, respectively, in Figs. 1 and 6, the electrode B in Figs. 7 and 8, the electrode B' in Fig. 6 and the electrode $B_2$ in Fig. 8 might be located at the surface of the earth. Similarly, surface ground electrodes in any of the figures might be located in the bore hole at a considerable distance from the electrode assembly without appreciably modifying the results obtained. Also, the potential measuring electrode may be placed anywhere in the vicinity of a zone in which a substantially null field is maintained according to the invention. The position at which the potential measurement is made can, if desired, also be located within the interval between two zones at which the field is substantially negligible. The specific embodiments disclosed herein, therefore, are not to be regarded as limiting in any way the scope of the appended claims.

I claim:

1. In a method for investigating the electrical resistivity of earth formations traversed by a bore hole containing a column of relatively conducting liquid, the steps of passing current between at least one location in the bore hole and a point remote from said one location to establish an electric field in the vicinity of the latter, altering the electric field associated with said current at at least one other location in the bore hole spaced from said one location in a direction longitudinally of the bore hole, so as to impede the flow of said current along the bore hole in the direction of said one other location, sensing a property of said electric field to obtain indications of changes therein, altering said field so as substantially to compensate for changes occurring therein, obtaining indications of the potential difference between a point near said one location and spaced apart therefrom and a reference point remote from said one location, and repeating said steps at different depths in the bore hole.

2. In a method for investigating the electrical resistivity of earth formations traversed by a bore hole containing a column of relatively conducting liquid, the steps of passing current between at least one location in the bore hole and a point remote from said one location, bringing substantially to zero the longitudinal electrical potential gradient associated with said current at at least one other location in the bore hole spaced longitudinally of the bore hole from said one location sensing a property of said potential gradient to obtain indications of changes therein, altering said potential gradient so as substantially to compensate for changes occurring therein, obtaining indications of the potential difference between a point near said one location and spaced apart therefrom and a reference point remote from said one location, and repeating said steps at different depths in the bore hole.

3. In a method for investigating the electrical resistivity of earth formations traversed by a bore hole containing a column of relatively conducting liquid, the steps of passing current between one location in the bore hole and a point remote from said one location, bringing substantially to zero the electrical field associated with said current at at least two other nearby longitudinally spaced apart locations in the bore hole on opposite sides of said one location, sensing a property of said electric field to obtain indications of changes therein, controlling the alteration of said field so as substantially to compensate for changes occurring therein, obtaining indications of the potential difference between at least one point near said one location and spaced apart therefrom and a reference point remote from said one location, and repeating said steps at different depths in the bore hole.

4. In a method for investigating the electrical resistivity of earth formations traversed by a bore hole containing a column of relatively conducting liquid, the steps of passing current between at least one location in the bore hole and a point remote from said one location, picking up the potential difference between two longitudinally spaced apart points near said one location, reducing the potential difference between said two points substantially to zero by passing current between another nearby location in the bore hole and a point remote from said another location, and obtaining indications of the potential difference between a point near said one location and spaced apart therefrom and a reference point remote from said one location.

5. In a method for investigating the electrical resistivity of earth formations traversed by a bore hole containing a column of relatively conducting liquid, the steps of passing current between one location in the bore hole and a point remote from said one location, picking up the potential difference between a first pair of longitudinally spaced apart points located on one side of said one location in the bore hole and longitudinally spaced apart therefrom, picking up the potential difference between another pair of longitudinally spaced apart points located on the opposite side of said one location in the bore hole and longituidnally spaced apart therefrom, reducing said potential differences substantially to zero by passing currents between locations near said pairs of points, respectively, and a remote reference point, and obtaining indications of the potential difference between at least one point near said one location and spaced apart therefrom and a reference point remote from said one location.

6. In a method for investigating the electrical resistivity of earth formations traversed by a bore hole containing a column of relatively conducting liquid, the steps of passing current between two longitudinally spaced apart locations in the bore hole and a point remote from said two locations, picking up potential differences between a point lying intermediate of said two locations and points lying beyond said two locations and longitudinally spaced apart therefrom, respectively, reducing said potential differences substantially to zero by emitting currents in the bore hole, and obtaining indications of the potential difference between at least one point near one of said two locations and spaced apart therefrom and a reference point remote from said one point.

7. In a method for investigating the electrical resistivity of earth formations traversed by a bore hole containing a column of relatively conducting liquid, the steps of passing current between at least one location in the bore hole and a point remote from said one location, picking up the potential difference between two longitudinally spaced apart points in the vicinity of said one location, reducing said potential difference by passing current between another location in the bore hole and a point remote from said another location, utilizing said potential difference to control the intensity of the current emitted at said another location so as to reduce said potential difference substantially to zero, and obtaining indications of the potential difference between a point near said one location and spaced apart therefrom and a reference point remote from said one location.

8. In a method for investigating the electrical resistivity of earth formations traversed by a bore hole containing a column of relatively conducting liquid, the steps of passing current between one location in the bore hole and a point remote from said one location, picking up potential differences between the two points of each of a plurality of longitudinally spaced apart pairs of points located on opposite sides of said one location, reducing said potential differences by passing current between other longitudinally spaced apart locations in the bore hole on opposite sides of said one location and a point remote from said other locations, utilizing said potential differences to control the intensity of the current emitted at said other locations so as to reduce said potential differences substantially to zero, and obtaining indications of the average of the potential differences between points near said one location and spaced apart therefrom and a reference point remote from said one location, respectively.

9. In a method for investigating the electrical resistivity of earth formations traversed by a bore hole containing a column of relatively conducting liquid, the steps of passing current between one location in the bore hole and a point remote from said one location, picking up potential differences between the two points of each of a plurality of longitudinally spaced apart pairs of points located on opposite sides of said one location, reducing said potential differences to desired values by passing current between other longitudinally spaced apart locations in the bore hole on opposite sides of said one location and a point remote from said other locations reducing said potential differences still further by passing current between still other longitudinally spaced apart locations in the bore hole on opposite sides of said one location and a point remote from said still other locations, utilizing said potential differences to control the intensity of the current emitted at said still other locations to reduce said potential differences substantially to zero, and obtaining indications of the potential difference between at least one point near said one location and longitudinally spaced apart therefrom and a reference point remote from said one location.

10. In a method for investigating the electrical resistivity of earth formations traversed by a bore hole containing a column of relatively conducting liquid, the steps of passing current between one location in the bore hold and a point remote from said one location, picking up potential differences between the two points of each of a plurality of longitudinally spaced apart pairs of points located on opposite sides of said one location, reducing said potential difference by passing current between other longitudinally spaced apart locations in the bore hole on opposite sides of said one location and a point remote from said other locations, utilizing the potential difference between one of said pairs of points to control the intensity of the current emitted at one of said other locations so as to reduce said potential difference substantially to zero, utilizing the potential difference between the other of said pairs of points to control the intensity of the current emitted at the other of said other locations so as to reduce said last named potential difference substantially to zero, and obtaining indications of the potential difference between at least one point near said one location and longitudinally spaced apart therefrom and a reference point remote from said one location.

11. In a well logging apparatus, the combination of an electrode adapted to be lowered into a well, electric source means connected to said electrode and to a point remote from said electrode for passing current from said electrode into the surrounding formations, electrical means responsive to the potential difference between a pair of longitudinally spaced apart points in the vicinity of said electrode for reducing said potential difference to a desired value, and means for providing indications of the potential difference between a point near said electrode and spaced apart therefrom and a reference point remote from said electrode.

12. In well logging apparatus, the combination of a first electrode adapted to be lowered into a well, electric source means connected to said electrode and to a point remote from said electrode for passing current from said electrode into the surrounding earth formations, a pair of longitudinally spaced apart electrodes mounted in fixed relation to said first electrode on opposite sides longitudinally thereof, electric source means connected to said pair of electrodes and to a relatively remote reference point and responsive to the potential difference between a pair of points in the vicinity of said electrodes for emitting current from said pair of electrodes to reduce to a reference value said potential difference, and means for providing indications of the potential difference between a point in the vicinity of said pair of points and a reference point remote from said pair of points.

13. In well logging apparatus, the combination of at least four lingitudinally spaced apart electrodes adapted to be lowered into a well, electric source means connected to one of said electrodes and to a point remote from said electrodes for passing current from said one electrode into the surrounding formations, electric source means responsive to the potential difference between two other of said electrodes for passing current between the fourth of said electrodes and a remote reference point to reduce said potential difference to a desired value, and means for providing indications of the potential difference between a point in the vicinity of said two other electrodes and a reference point remote from said two other electrodes.

14. In well logging apparatus, the combination of at least four longitudinally spaced apart electrodes adapted to be lowered into a well, electric source means connected to the center electrode and to a point remote from said electrodes for passing current from said center electrode through the surrounding formations, means responsive to the potential differences between the electrodes in each pair of two pairs of electrodes located on opposite sides of said center electrode, respectively, for passing current between the two other electrodes located on opposite sides of said center electrode, respectively, and to a point remote from said two other electrodes so as to reduce said potential differences to desired values, and means for obtaining indications of the potential difference between at least one point located in the vicinity of one of said pairs of electrodes and a reference point remote from said one pair of electrodes.

15. In well logging apparatus, the combination of a first electrode adapted to be lowered into a bore hole, first, second and third groups of electrodes mounted in fixed relation to said first electrode, the electrodes in each group being longitudinally spaced apart on opposite sides of said electrode and the spacing between the electrodes in each group being greater than the spacing between the electrodes of the preceding group, electrical connections between the electrodes in each group, electric source means connected to said first electrode and to a remote point for passing current from said electrode into the surrounding formations, amplifier means having input terminals connected to receive the potential difference between two intermediate groups of electrodes and having output terminals connected to pass between one electrode of the outermost group and a reference point remote therefrom current of proper magnitude and polarity to reduce said potential difference substantially to zero, and means for providing indications of the potential difference between a point in the vicinity of adjacent electrodes of said two intermediate groups and a reference point remote from said adjacent electrodes.

16. In well logging apparatus, the combination of a first electrode adapted to be lowered into a well, first, second, third and fourth groups of electrodes mounted in fixed relation to said first electrode, the electrodes in each group being longitudinally spaced apart on opposite sides of said electrode and the spacing between the electrodes in each group being greater than the spacing between the electrodes of the preceding pair, electrical connections between the electrodes in each group, amplifier means having output terminals and input terminals, means for connecting said amplifier input terminals selectively to receive the potential difference between two or three intermediate groups of electrodes, means connecting the amplifier output terminals to pass between the outermost group of electrodes and a relatively remote reference point current of proper magnitude and polarity to reduce said potential difference substantially to zero, and means for providing indications of the potential difference between a point in the vicinity of adjacent ones of said intermediate groups of electrodes and a reference point remote from said adjacent electrodes.

17. In a well logging apparatus, the combination of a first electrode adapted to be lowered into a well, first, second and third groups of electrodes mounted in fixed relation to said first electrode, the electrodes in each of said groups being longitudinally spaced apart on opposite sides of said first electrode and the spacing between each group of electrodes being greater than the spacing between the preceding group, electrical connections between the electrodes in each of said groups, first electric source means connected to said first group of electrodes and to a remote reference point for passing current from said first pair of electrodes into the surrounding formations, second electric source means responsive to the potential difference between said first electrode and at least one of the electrodes in said second group of electrodes for supplying current to at least one of the electrodes in said third group of electrodes and to a remote reference point so as to reduce said potential difference to a desired value, and means for providing indications of the potential difference between said first electrode and a reference point remote from said first electrode.

18. In well logging apparatus, the combination of a first electrode adapted to be lowered into a well, first, second, third and fourth groups of electrodes mounted in fixed relation to said first electrode, the electrodes in each of said groups being longitudinally spaced apart on opposite sides of said first electrode and the spacing between each group of electrodes being greater than the spacing between the preceding group, electrical connections between the electrodes in each of said groups, a source of periodically varying electrical energy at the surface of the earth connected to supply periodically varying current to said first electrode and to a remote reference point, amplifier means disposed in the bore hole with said electrodes and connected to be energized by said source, said amplifier means having input terminals connected to receive the periodically varying potential difference between said first and third groups of said electrodes and having output terminals connected to pass between said fourth group of electrodes and a remote reference point periodically variable current of proper magnitude and phase to reduce said periodically variable potential difference substantially to zero, and means for providing indications of the potential difference between said second group of electrodes and a reference point remote from said second pair of electrodes.

19. In apparatus for simultaneously logging the electrical resistivity of earth formations traversed by a well and static spontaneous potentials therein, the combination of a first electrode adapted to be lowered into a well, first, second, third and fourth groups of electrodes mounted in fixed relation to said first electrode, the electrodes in each of said groups being longitudinally spaced apart on opposite sides of said first electrode and the spacing between each group being greater than the spacing between the preceding group, electrical connections between the electrodes in each of said groups, a source of periodically varying electrical energy connected to supply periodically varying current to said first electrode and to a remote reference point, first amplifier means connected to receive electrical energy from said source, said amplifier means having input terminals connected to receive the periodically variable potential difference between two of said groups of electrodes and having output terminals connected to pass between another of said groups of electrodes and a remote reference point periodically variable current of proper magnitude and phase to reduce said periodically variable potential difference substantially to zero, first indicating means for providing indications of the periodically varying potential difference between another of said groups of electrodes and a remote reference point, first filter means for keeping continuous potential differences out of said first indicating means, second amplifier means having input terminals connected to receive the D. C. potential difference between said first electrode and one of said groups of electrodes, and having output terminals connected to pass between another of said groups of electrodes and a remote reference point D. C. of proper magnitude and polarity to reduce said D. C. potential difference substantially to zero, second filter means for keeping the output of said second amplifier means out of the input circuit of said first amplifier means, second indicating means for providing indications of the continuous potential difference between said first electrode and a remote reference point, and third filter means interposed between the first electrode and the input terminals of said second amplifier means for keeping periodically varying electrical energy out of the latter and out of said indicating means.

20. In well logging apparatus the combination of a first electrode adapted to be lowered into a well, first, second and third groups of electrodes mounted in fixed relation to said first electrode, the electrodes in each of said groups being longitudinally spaced apart on opposite sides of said first electrode and the spacing between the electrodes in each group being greater than the spacing for the preceding group, electric source means connected to supply electrical energy to said first electrode and to a remote reference point, first amplifier means having input terminals connected to receive the potential difference between two electrodes located on the same side of said first electrode, and having output terminals connected to pass between another electrode located on said same side of said one electrode and a remote reference point current of proper polarity and magnitude to reduce said potential difference substantially to zero, second amplifier means having input terminals connected to receive the potential difference between two electrodes located on the other side of said first electrode, and having output terminals connected to pass between another electrode located on said other side of the first electrode and a remote reference point current of proper magnitude and polarity to reduce said last-named potential difference substantially to zero, and means for providing indications of the potential difference between at least one point in the vicinity of two electrodes connected to the input terminals of one of said amplifier means, and a remote reference point.

21. In well logging apparatus, the combination of an electrode array adapted to be lowered into a bore hole, said electrode array comprising a first electrode and four groups of other electrodes, each group being disposed symmetrically above and below a plane extending transversely of the bore hole and passing through said first electrode, and the spacings between the electrodes in each of the groups varying from a maximum for the outermost fourth group to a minimum for the innermost first group, first electric source means connected to supply current to said first electrode and to a remote reference point, second electric source means connected to supply electric current to the electrodes of one of the two outer groups and to a remote reference point to reduce the potential difference between an electrode of the second group and the corresponding electrode of said first group, amplifier means having input terminals connected to said electrode of said second group and to said corresponding electrode of said first group, and having output terminals connected to supply current to the electrodes of the other of said two outer groups and to a remote reference point further to reduce the said potential difference substantially to zero, and means for providing indications of the potential difference between at least one point in the vicinity of said reduced potential difference and a remote reference point.

22. In a method for investigating the electrical resistivity of earth formations traversed by a bore hole containing a column of relatively conducting liquid, the steps of passing current between one location in the bore hole and a remote reference point, picking up the potential difference between a pair of longitudinally spaced apart points located on one side of said one location and longitudinally spaced apart therefrom, picking up the potential difference between a second pair of longitudinally spaced apart points located on the opposite side of said one location in the bore hole and longitudinally spaced apart therefrom, passing currents between locations near said pairs of points, respectively, and a remote reference point to reduce said potential differences substantially to zero, and obtaining indications of the potential difference between said one location and a remote reference point.

23. In well logging apparatus, the combination of an electrode array adapted to be lowered into a bore hole, said electrode array comprising a first electrode and three groups of other electrodes, each group being disposed symmetrically on opposite sides of a plane extending transversely of the bore hole and passing through said first electrode, and the spacings between the electrodes in each of the groups varying from a maximum for the outermost third group to a minimum for the innermost first group, first electric source means connected to supply current to said first electrode and to a remote reference point, means for emitting current in the bore hole to reduce the potential difference between an electrode of the second group and the corresponding electrode of said first group, amplifier means having input terminals connected to said electrode of said second group and to said corresponding electrode of said first group, and having output terminals connected to supply current to the electrodes of said outermost group and to a remote reference point further to reduce the said potential difference substantially to zero, and means for providing indications of the potential difference between at least one point in the vicinity of said reduced potential difference and a remote reference point.

24. In a method for maintaining a desired electric field distribution in earth formations surrounding a bore hole drilled into the earth at different levels therein, the steps of establishing a desired electric field in the formations at different levels in the well, detecting at each of said levels changes in the distribution of said electric field in a direction longitudinally of the bore hole, passing current through the formations at each of said levels between a point in the bore hole in the vicinity of the electrical field established thereat and a remote reference point, and adjusting said current at each of said levels as required to maintain said electric field distribution substantially unaltered.

25. In a method for investigating the electrical resistivity of earth formations traversed by a bore hole containing a column of relatively conducting liquid, the steps of passing current between one location in the bore hole and a point remote from said one location, obtaining indications of potential difference between at least two points in the vicinity of said one location that are spaced apart in a direction longitudinally of the bore hole with respect to said one location and in the path of current flowing therefrom, establishing an electric field distribution near said points in the bore hole, adjusting the intensity and polarity or phase of said electric field distribution so as to maintain said potential difference substantially at zero, and obtaining indications of potential difference between a point in the bore hole where the resultant electric potential gradient attributable to the electric current flowing at said location and to said electric field distribution is substantially zero, and a reference point remote therefrom.

26. In a method for investigating the electrical resistivity of earth formation traversed by a bore hole containing a column of relatively conducting liquid, the steps of passing current between one location in the bore hole and a point remote from said one location, obtaining indications of potential difference between two points in the vicinity of said location that are spaced apart in a direction longitudinally of the bore hole with respect to said one location and in the path of current flowing therefrom, and between two other points in the vicinity of said one location that are spaced apart in the opposite direction with respect to said one location and in the path of current flowing therefrom, establishing an electric field distribution near said points in the bore hole, adjusting the intensity and polarity or phase of said electric field distribution so as to maintain the potential differences between said two points and between said two other points substantially at zero, and obtaining indications of potential difference between a point in the bore hole where the resultant electric potential gradient attributable to the current supplied to said one location and to said electric field distribution is substantially zero, and a reference point remote therefrom.

27. In a method for investigating the electrical resistivity of earth formations traversed by a bore hole containing a column of relatively conducting liquid, the steps of passing current between one location in the bore hole and a point remote from said one location, obtaining indications of potential difference between at least two points in the vicinity of said one location that are spaced apart in a direction longitudinally of the bore hole with respect to said one location and in the path of current flowing therefrom, establishing an electric field distribution near said points in the bore hole, adjusting the intensity and polarity or phase of said electric field distribution so as to maintain said potential difference substantially at zero, and obtaining indications of potential difference between a point at said one location and a reference point remote therefrom.

28. In well logging apparatus, the combination of an electrode adapted to be lowered into a well, electric source means connected to said electrode and to a remote reference point for passing current from said electrode into the surrounding formations, energized electrical means responsive to the potential difference between a pair of longitudinally spaced apart points in the vicinity of said electrode for establishing an electric field distribution near said electrode in the bore hole to reduce said potential difference substantially to zero, and means for providing indications of potential difference between said electrode and a reference point remote therefrom.

29. A method of making an electric log of the resistivity of the formations adjacent a well which contains an electrically conductive medium, that comprises introducing a first electrical current into a first portion of said electrically conductive medium in a manner such that said first electrical current will have a substantial vertical component, introducing a second electrical current of a polarity opposite to that of said first electrical current into a second portion vertically spaced from said first portion of said electrically conductive medium in a manner such that said second electrical current will have a substantial vertical component, whereby the flow of the vertical components of the current in opposite directions in said portions will create a region between said portions of substantially equal potential with respect to remote portions of said electrically conductive medium, detecting variations in said potential, employing said detected variations to maintain the region of equal potential between said first and second portions of said electrically conductive medium, and obtaining indications of variations in the potential at a place in said region with respect to a location substantially at the same potential as said remote portions of the electrically conductive medium.

30. A method of making an electric log of the resistivity of the formations adjacent a well which contains an electrically conductive medium, that comprises introducing a first electrical current into a first portion of said electrically conductive medium in a manner such that said first electrical current will have a substantial vertical component, introducing a second electrical current of a polarity opposite to that of said first electrical current into a second portion vertically spaced from said first portion of said electrically conductive medium in a manner such that said second electrical current will have a substantial vertical component, whereby the flow of the vertical components of the current in opposite directions in said portions will create a region between said portions of substantially equal potential with respect to remote portions of said electrically conductive medium, detecting variations in said potential, employing said detected variations to control the electrical current introduced into one of said portions of the conductive medium to reestablish said region of equal potential, obtaining indications of variations in the potential at a place in said region with respect to a location substantially at the same potential as said remote portions of the electrically conductive medium.

References Cited in the file of this patent

UNITED STATES PATENTS

| | | |
|---|---|---|
| 2,347,794 | Piety | May 2, 1944 |
| 2,446,303 | Owen | Aug. 3, 1948 |